US008348556B2

(12) United States Patent
Hilgraf et al.

(10) Patent No.: US 8,348,556 B2
(45) Date of Patent: Jan. 8, 2013

(54) SOLIDS DISTRIBUTOR FOR INJECTION PLANTS, BLAST FURNACES AND THE LIKE

(75) Inventors: Peter Hilgraf, Hamburg (DE); Dietrich Schumpe, Bardowick (DE); Hans-Dieter Nolde, Adendorf (DE); Volker Goecke, Kakerbeck (DE)

(73) Assignee: Claudius Peters Projects GmbH, Buxtehude (DE)

( * ) Notice: Subject to any disclaimer, the term of this patent is extended or adjusted under 35 U.S.C. 154(b) by 460 days.

(21) Appl. No.: 12/446,426

(22) PCT Filed: Oct. 22, 2007

(86) PCT No.: PCT/EP2007/009131

§ 371 (c)(1),
(2), (4) Date: Apr. 20, 2009

(87) PCT Pub. No.: WO2008/046656

PCT Pub. Date: Apr. 24, 2008

(65) Prior Publication Data

US 2010/0316472 A1 Dec. 16, 2010

(30) Foreign Application Priority Data

Oct. 20, 2006 (DE) .................... 20 2006 016 093 U

(51) Int. Cl.
*B65G 53/40* (2006.01)

(52) U.S. Cl. ........ 406/123; 406/146; 406/156; 406/181; 110/105; 110/288

(58) Field of Classification Search .................. 406/123, 406/15, 156, 181, 146; 110/105, 287, 288
See application file for complete search history.

(56) References Cited

U.S. PATENT DOCUMENTS 1,871,853 A * 8/1932 Kennedy ...................... 406/181
(Continued)

FOREIGN PATENT DOCUMENTS

CN 2503368 7/2002
(Continued)

OTHER PUBLICATIONS

International Search Report, mailed Feb. 14, 2008, directed to counterpart International Patent Application No. PCT/EP2007/009131; 6 pages.

*Primary Examiner* — Joseph A Dillon, Jr.
(74) *Attorney, Agent, or Firm* — Morrison & Foerster LLP

(57) ABSTRACT

A solids distributor for injection plants includes a collecting chamber having a plurality of lance lines leading away from the chamber. The chamber has a supply connection for a solid to be distributed and is surrounded by a common wall in which a plurality of ports is formed. The lance lines are connected to the ports, and an annular gap is formed in front of the ports and along the common wall. A pressure vessel is arranged geodetically above the collecting chamber, the lower part of the pressure vessel being designed as a bunker, having an outlet providing a direct and continuous junction to the supply connection and an upper part designed as a gas space. The collecting chamber may include a central displacement body which forms the annular gap with the common wall and which may be an upwardly tapering cone which projects out of the collecting chamber.

14 Claims, 3 Drawing Sheets

U.S. PATENT DOCUMENTS

| | | | | | |
|---|---|---|---|---|---|
| 2,702,207 | A | * | 2/1955 | Shirk | 406/123 |
| 2,913,279 | A | * | 11/1959 | Pfening | 406/33 |
| 3,267,891 | A | * | 8/1966 | Hemker | 110/232 |
| 3,272,561 | A | * | 9/1966 | Farnsworth et al. | 406/181 |
| 3,306,671 | A | * | 2/1967 | Leeman | 406/123 |
| 3,797,890 | A | * | 3/1974 | Walters | 406/33 |
| 3,972,567 | A | * | 8/1976 | Uhl | 406/181 |
| 4,131,072 | A | * | 12/1978 | Lingl et al. | 110/106 |
| 4,191,500 | A | * | 3/1980 | Oberg et al. | 406/146 |
| 4,215,824 | A | * | 8/1980 | Weiste | 239/655 |
| 4,356,779 | A | * | 11/1982 | Porter et al. | 110/245 |
| 4,453,866 | A | * | 6/1984 | Ryan | 406/70 |
| 4,483,646 | A | * | 11/1984 | Moriyama | 406/14 |
| 4,562,968 | A | * | 1/1986 | Widmer et al. | 239/655 |
| 4,685,843 | A | * | 8/1987 | Kelm | 406/181 |
| 4,758,118 | A | * | 7/1988 | Rachner et al. | 406/24 |
| 4,790,692 | A | * | 12/1988 | Bunyoz et al. | 406/181 |
| 4,938,848 | A | * | 7/1990 | Raines et al. | 205/392 |
| 5,285,735 | A | * | 2/1994 | Motoi et al. | 110/101 CB |

FOREIGN PATENT DOCUMENTS

| | | | |
|---|---|---|---|
| CN | 1715160 | | 1/2006 |
| DE | 410681 | | 3/1925 |
| DE | 3603078 | | 10/1987 |
| EP | 0 068 115 | | 1/1983 |
| FR | 1 345 088 | | 12/1963 |
| FR | 1 523 375 | | 5/1968 |
| SU | 1717640 | A1 | 3/1992 |

* cited by examiner

SOLIDS DISTRIBUTOR FOR INJECTION PLANTS, BLAST FURNACES AND THE LIKE

REFERENCE TO RELATED APPLICATION

This application is the national stage under 35 USC 371 of International Application No. PCT/EP2007/009131, filed Oct. 22, 2007, which claims the priority of German Patent Application No. 20 2006 016 093.0, filed Oct. 20, 2006, the entire contents of which are incorporated herein by reference.

FIELD OF THE INVENTION

The invention relates to a solids distributor for injection plants, in particular for blast furnaces, with a chamber and with a plurality of lance lines leading away, the chamber having a supply connection for a solid, such as ground coal, which is to be distributed. The invention relates, further, to a distributor head for such a solids distributor.

BACKGROUND OF THE INVENTION

For the heating of blast furnaces, burners in power stations and similar apparatus, ground solid fuel, in particular coal, is increasingly used as fuel. This affords the advantage that, as compared with the combustible material conventionally used, such as coke, or even oil, a marked saving in terms of operating costs becomes possible. In order to allow uniform supply of the ground fuel into the furnace, a multiplicity of nozzle lances are usually arranged around the furnace. The ground fuel is supplied to them via individual lines ("lance lines"). In order to distribute the ground fuel, supplied by a grinding device, such as a coal mill, or an interposed conveying device, to the individual lines leading to the lances, a fuel distributor is provided. This has a chamber, to which the ground fuel is supplied via a connection. A multiplicity of individual lines lead from the chamber to the respective lances. One difficulty of this is that, in practice, an uneven distribution of the ground fuel to the individual lines often occurs, with the result that different quantities are supplied to the individual lances. This leads to different combustion and consequently to uneven heating of the individual fuel nozzles, this being undesirable.

In order to achieve an equalization and regulation of the supply to the individual lances, a coal distributor became known which has individual quantity controls on the individual lines leading to the lances (SU-A-1717640). One disadvantage of the solution is that it becomes increasingly more complicated with a rising number of lines, and, moreover, an only inadequate result is often achieved in spite of the considerable outlay. This applies particularly when the ground coal is supplied to the coal distributor over a relatively long delivery distance.

In another approach, a coal distributor is provided which has a pressure vessel with a chamber arranged below it (DE-C-3603078). In this case, the chamber is divided into a plurality of subchambers separated from one another, in each case one of the lance lines being connected to each subchamber. Further, a bottom connection for the supply of carrier gas is provided on each subchamber. However, distribution to the subchambers cannot achieve a sufficient equalization of the feed streams in the lance lines, and therefore individual controls on the lance lines have to be adopted in order to compensate quantitative differences. This is complicated.

SUMMARY OF THE INVENTION

The object on which the invention is based is, starting from the prior art last mentioned, to improve a solids distributor of the type initially mentioned, to the effect that a better equalization is achieved at a low outlay.

The solution according to the invention lies in the features of invention as broadly described herein. Advantageous developments are the subject matter of the detailed description below.

According to the invention, in a solids distributor for injection plants, in particular for blast furnaces, with a chamber and with a plurality of lance lines leading away, the chamber having a supply connection for a solid to be distributed, there is provision for the chamber to be a collecting chamber surrounded by a common wall, so that the lance lines connected to it are connected to one another within the collecting chamber, there being arranged geodetically above the collecting chamber a pressure vessel, the lower part of which is designed as a bunker and has an outlet connected to the supply connection and, further, the upper part of which is designed as a gas space.

The essence of the invention is to provide the distributor with a collecting chamber which is surrounded by a common wall to which the lance lines are connected directly. The invention has recognized that a substantial cause of the unsatisfactory quality of the distribution to the lance lines is a segregation of the solid supplied from its feed gas. As a result, the solid no longer reaches the distributor and the lance lines in a homogeneous distribution, and therefore an uneven pulsating mass flow is obtained. These inhomogeneities are so great and have such dynamics that they can often no longer be compensated by means of the individual controls used according to the prior art on the individual lance lines; distributors with individual chambers, to which a lance line is connected in each case, are just as incapable of ensuring the required compensation.

The merit of the invention is to recognize that the adverse consequences of segregation can be effectively counteracted only by means of an improved original distribution in the distributor itself, specifically by the lance lines being connected to the common wall, thus relieving the individual lance controls or ideally making them superfluous. It is preferable to design the junctions between the connections for the lance lines within the collecting chamber as an annular slot. The annular slot causes a tangential flow direction which is especially efficient for compensation between the radially directed substance flows into the lance lines. In this case, the annular slot can be provided in a simple way, for example by means of a displacement body which is arranged centrally in the collecting chamber and the outside of which is spaced apart from the peripheral common wall and therefore forms an annular slot. Preferably, the displacement body is designed to taper upward, that is to say in the direction of the pressure vessel. The outer casing of said displacement body consequently forms a sloping surface with respect to the solid entering the collecting chamber and therefore itself contributes to distribution to the individual lance lines. In particular, by means of such a centrally arranged displacement body, the formation of skeins, in which a preferred flow channel into one of the lance lines forms in the material, can be effectively counteracted. A conical displacement body can be produced particularly expediently and at low outlay.

The invention thus makes it possible to dispense with the complicated individual lance control provided in the prior art. Furthermore, it also makes it possible to supply the solid over a longer delivery distance upstream of the distributor. Even greater flexibility in the supply of solids is therefore additionally achieved, so that the invention is also well suited to the retrofitting or conversion of existing plants.

The term "solid" is to be understood in the present context as meaning fine-grained or coarse-grained stock. This is preferably those materials which serve as fuel, such as, in particular, coal, for the charging of power station burners and the firing of gas furnaces, lime shaft kilns or glass melting furnaces. However, it is not necessarily fuel, but may also be material to be processed.

With the solid being located in the bunker of the pressure vessel, a decoupling of the charging of the lances from the preceding feed is obtained. Pressure fluctuations, such as occur particularly due to pulsations in the supply to the pressure vessel, can therefore no longer reach the collecting chamber or reach it only in a highly damped manner. Moreover, fluctuations in the feed flow lead merely to variations in the solid filling level in the pressure vessel, and the outflows flowing into the lance lines remain unchanged. An appreciable improvement with regard to the uniform distribution of the solid supplied to the collecting chamber into the individual lance lines is thus achieved.

Expediently, a regulating device is provided which acts on the solid located in the bunker. By the supply being varied, equalization, even under changing load conditions, can be achieved here. It is particularly preferable if the regulating device is a filling height control for the solid. It is designed to keep the filling height in the vessel as constant as possible. Further, it may be designed to ensure that a minimum filling height is maintained during operation. Expediently, the actual height is determined via a determination of the weight of the overall vessel which for this purpose is mounted on load cells. However, the height may also be measured directly, for example by means of capacitive or microwave sensors.

The regulating device may also be designed as pressure control. It serves for regulating the gas pressure which acts upon the solid supplied. In the simplest instance, for this purpose, a pressure sensor is provided in the gas space of the pressure vessel. Preferably, however, the pressure at a lower point is used, to be precise level with the connection of the lance lines to the common wall of the collecting chamber. Consequently, a decrease in the solid stream through the lance lines in the case of a decreasing filling level in the pressure vessel, such as occurs in pressure control on the gas space, is avoided. Pressure control is preferably connected to the gas space via a filter resistant to pressure pulses. Robust operation, even under rough conditions, is thereby ensured.

Expediently, a regulatable nitrogen infeed is additionally arranged on the gas space of the pressure vessel. This infeed makes it possible to stabilize more effectively the pressure in the pressure vessel or in the distributor collecting chamber connected to it, and, if appropriate, to adapt said pressure sensitively according to the requirements arising as a result of the operating states. Particularly in combination with the pressure regulating device, a closed loop can thus be formed, by means of which even pronounced fluctuations in the supply of the solid, such as may occur particularly over greater distances or in the case of a multiflow supply, can be smoothed out.

The pressure vessel is preferably arranged directly on the collecting chamber. The solid which accumulates in the lower part of the pressure vessel, said part being designed as a bunker, can then pass directly into the collecting chamber of the distributor solely under the influence of gravity without any further obstacle. A both more reliable and more uniform supply into the collecting chamber is consequently achieved. The bunker is expediently of funnel-shaped design. Even if the solid quantities located in the pressure vessel are small, a reliable feed is thus ensured, whereas, when quantities located in the bunker are large, the filling height and, consequently, the static pressure acting on the supply connection rise only underproportionally. Further equalization is consequently achieved. The situation should not be ruled out, however, where the pressure vessel is connected to the supply connection of the collecting chamber via a downpipe, in which case the downpipe may run vertically or even at an inclination. It is essential that the pressure vessel is located geodetically above the collecting chamber.

For a further improvement in uniformity, there may be provision for a specific individual line control unit to be arranged in each case additionally on the lance lines. An especially high degree of uniformity can consequently be achieved. Individual line controls for lance lines are known per se. Since a high fundamental uniformity between the individual lance lines is already achieved by virtue of the arrangement according to the invention, the preconditions are afforded for achieving virtually perfect equalization by means of an individual line control which acts with particular sensitivity. As a further optional or alternative possibility for further equalization, gas supplies may be provided which preferably issue on the bottom of the collecting chamber. They bring about an additional ventilation of the distributor from below, thus achieving further system decoupling.

The invention extends, further, to a distributor head as described herein. It is suitable particularly for building under existing pressure vessels and, consequently, for the simple retrofitting of conventional solids distribution plants already existing.

BRIEF DESCRIPTION OF THE DRAWINGS

The invention is explained below with reference to the accompanying drawing which illustrates an advantageous exemplary embodiment and in which.

DETAILED DESCRIPTION OF THE INVENTION

Figure 1:
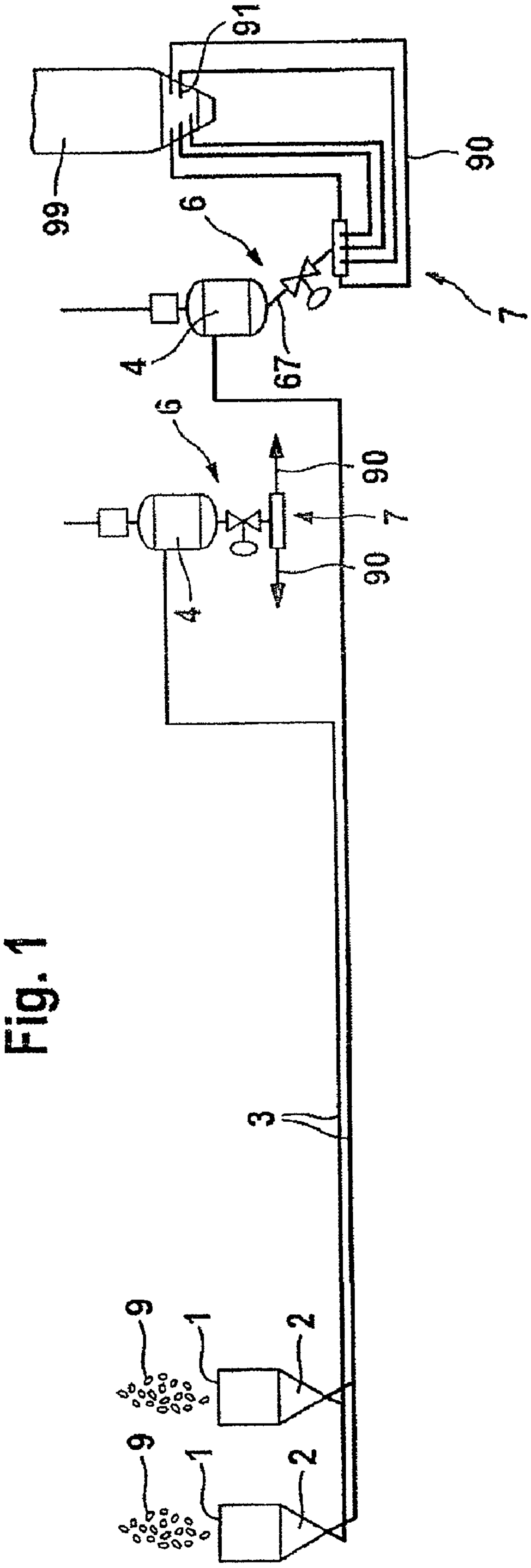
FIG. 1 shows a diagrammatic view of a supply plant for pulverized coal.

The invention is explained by the example of a plant which supplies ground coal as solid fuel to a blast furnace. The plant, illustrated in FIG. 1, for the supply of pulverized coal is of double-flow design. This means that two parallel strings are provided, which are constructed identically to one another. Only one string is therefore described in more detail below; the statements apply correspondingly to the other string.

Coal 9 is supplied from above to a conveying plant 2 via a feed port 1. The conveying plant may be designed as a twin pressure vessel plant known per se.

The ground coal passes into a supply line 3, by means of which it is supplied to a coal distributor 6 at a blast furnace 99 (illustrated for only one string). The line 3 may have a considerable length, distances of several hundred meters up to one kilometer being possible.

The supply line 3 issues in the upper region, designed as a gas space 41, of a pressure vessel 4 of the coal distributor 6. Its lower region is designed as a coal bunker 42. The coal passes out of the coal bunker 42 into a distributor head 7, arranged below the pressure vessel 4, of the coal distributor. In the exemplary embodiment illustrated, in one string, the pressure vessel 4 is arranged exactly above the distributor head 7, although this is not absolutely necessary. An arrangement geodetically above the distributor head 7 is sufficient, while the junction may also take place via an oblique downpipe 67, as illustrated in the other string. The distributor head 7 distributes the coal supplied via the pressure vessel 4 to a multiplicity of lance lines 90 which lead to nozzles 91 on the blast furnace 99.

Figure 2:
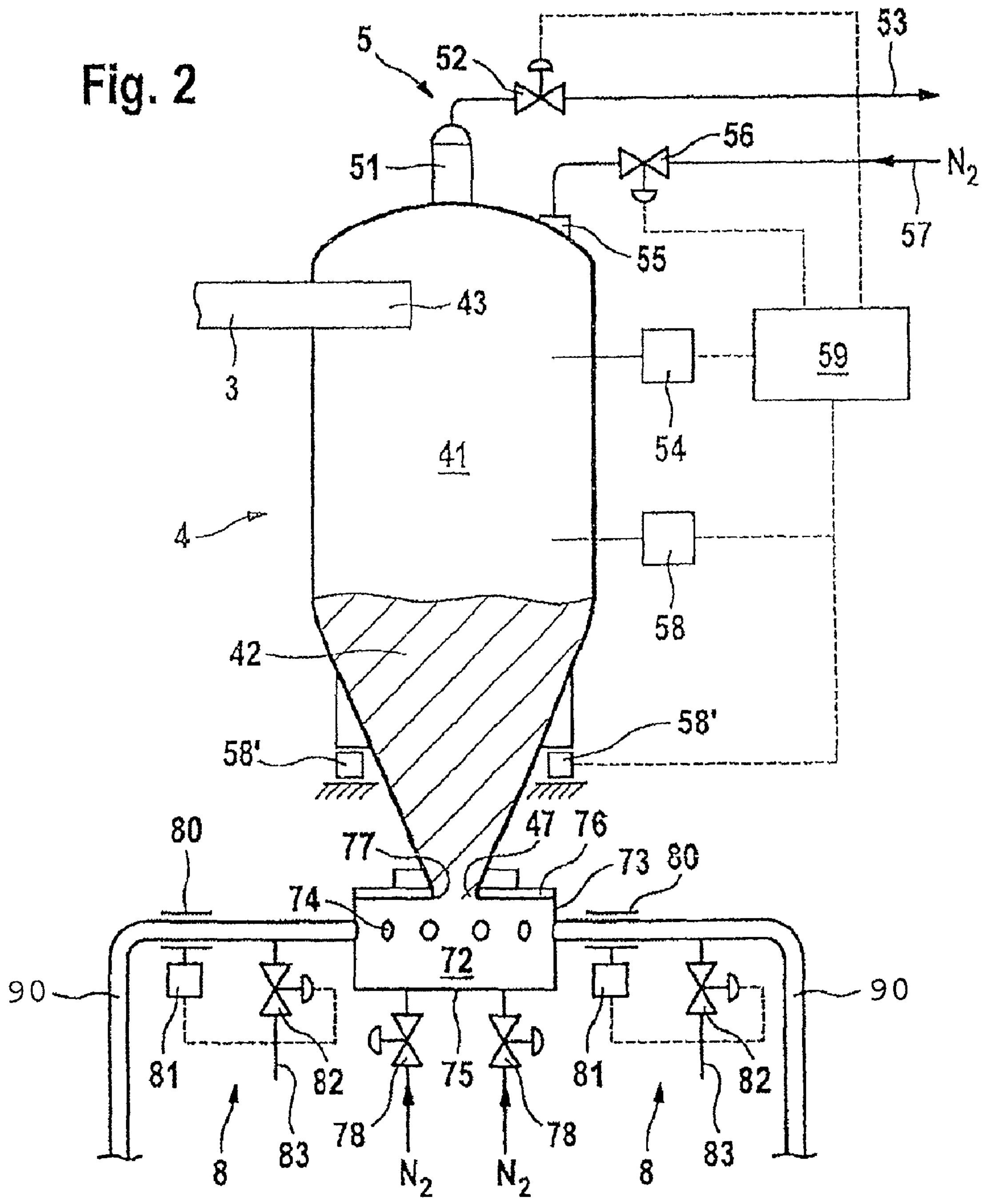
FIG. 2 shows a diagrammatic view of a coal distributor with a pressure vessel according to one exemplary embodiment of the invention.

Reference is made, then, to FIG. 2. The pressure vessel 4 has an approximately cylindrical configuration in its upper region functioning as a gas space 41. In its lower region functioning as a coal bunker 42, the pressure vessel 4 has a shape tapering conically downward. The line 3, via which the ground coal is supplied, issues in the region of the gas space 41 at an inlet connection 43. A pressure regulating device 5 is arranged in the upper region of the gas space 41. It comprises a filter 51 which is connected at its end to the upper vertex of the gas space 41 and the other end of which is connected to a discharge line 53. The discharge line 53 contains a regulating valve 52 which is connected to a control device 59. Further, a pressure sensor 54 and a filling level sensor are provided, which measure the gas pressure and the filling level prevailing in the gas space 41 and which transmit these as a measurement signal to the control device 59. The filling level measurement may take place directly, for example via a radar sensor 58, or indirectly via load cells 58' which are arranged in the foundation of the pressure vessel 4 and which determine its overall weight and, from this, the respective filling level. The embodiment illustrated shows, further, an optional nitrogen infeed. This comprises a nitrogen line 57 which is connected via an actuating valve 56 to a gas connection 55 in the upper region of the gas space 41 of the pressure vessel. The actuating valve 56 of the nitrogen infeed is likewise connected to the control device 59.

At the lower end of the pressure vessel 4, an outlet port 47 is formed. This is placed directly onto a corresponding supply connection 77 of the distributor head 7. This gives rise to a direct and continuous junction from the coal bunker 42 into a common collecting chamber 72 of the distributor head 7. The common collecting chamber 72 is surrounded by a single peripheral cylindrical wall 73 in which a plurality of ports 74 are formed. The ports 74 are distributed at equal intervals, approximately at mid-height, over the circumference of the wall 73. They function as connections for lance lines 90 and connect the collecting chamber 72 to the nozzles 91 arranged on the blast furnace. The collecting chamber 72 is closed, pressure-resistant, upward and downward by means of a bottom plate 75 and a cover plate 76 in which the supply connection 77 is formed. The cover plate 76 is optional and may be dispensed with if the cross section of the supply connection 77 of the distributor head 7 is equal to the cross section of the outlet port 47 of the coal bunker 42.

Figure 3:
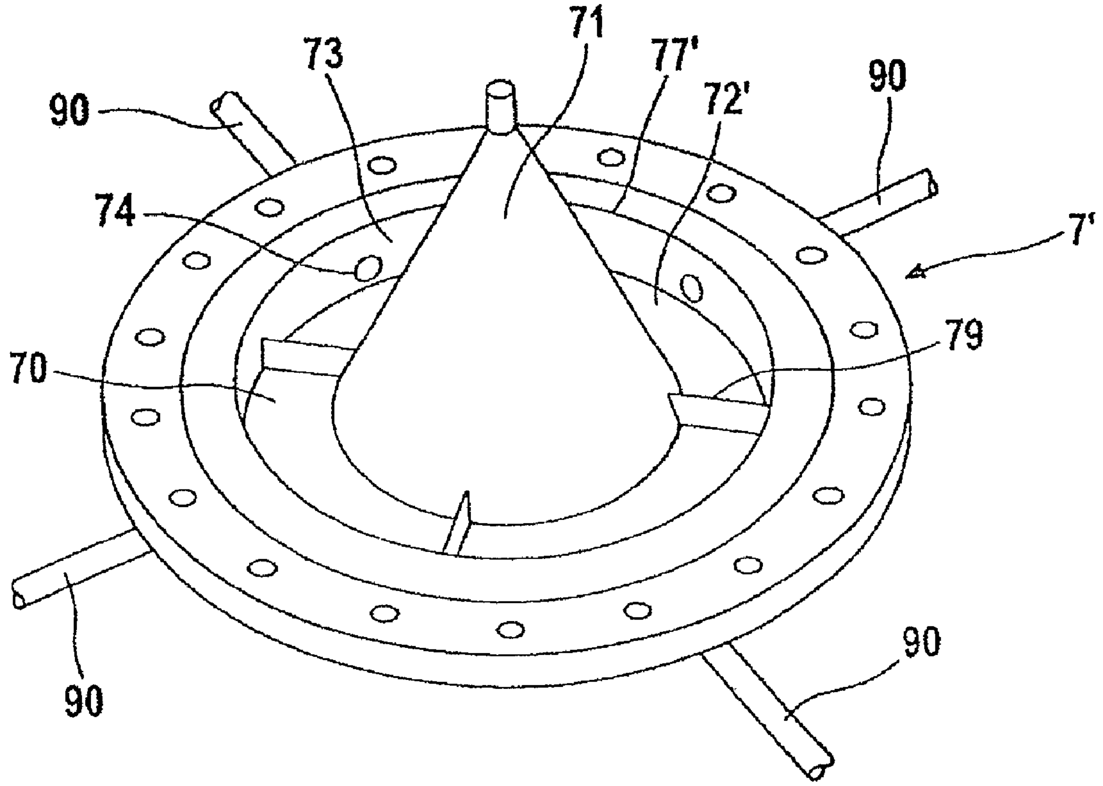
FIG. 3 shows a perspective view of a distributor head according to a second exemplary embodiment.

Such a variant is illustrated in FIG. 3 as a distributor head 7'. Identical elements are given the same reference symbols as in the embodiment illustrated in FIG. 2. The collecting chamber 72' is open upwardly. It can be seen that a plurality of radial baffle plates 79 are arranged in the collecting chamber 72'. They extend over half the height of the collecting chamber 72' in the exemplary embodiment illustrated, but may also be higher or lower. They serve for swirling in a directed manner a flow circulating tangentially in the collecting chamber 72', in order to achieve better intermixing. Of course, the baffle plates 79 may also be provided in the embodiment, illustrated in FIG. 2, having a cover plate 76.

What can also be seen in FIG. 3 is a cone 71 as a centrally arranged displacement body. Its surface area delimits with the peripheral wall 73 an annular slot 70. This not only forms a direct flow connection between the ports 74, but imparts a tangential component to the flow in the common collecting chamber 72'. This tangential component is reinforced by the baffle plates 79 and improves the intermixing in the common collecting chamber 72' and consequently the distribution of the coal to the lance lines 90 connected to the ports 74. This arrangement is particularly suitable for preventing or for breaking up skeins in the flow.

To further assist the feed and homogenization of the coal through the lance lines 90, nitrogen supplies 78 are expediently provided on the bottom 75 of the coal distributor 7. These supply nitrogen gas which serves for loosening and fluidizing the coal in the collecting chamber 72, in order thereby to transport it more uniformly through the lance lines 90 to the nozzles 91.

Further, in each case an optional individual line control unit 8 is arranged on the lance lines 90. This comprises a quantity sensor 80 which acts on an actuating valve 82 via a compact control unit 81. The actuating valve 82 regulates the supply of nitrogen supplied via a delivery line 83 into the individual line 90. The individual line control units 8 of the various lance lines 90 may operate independently or be synchronized by a common control apparatus (not illustrated). They are designed, by means of a regulatable supply of nitrogen, to set finely the throughflow of coal through the lance line 90.

The arrangement functions as follows. Ground coal is introduced via the line 3 into the pressure vessel 4 via the connection 43. Segregation takes place in the pressure vessel 4, the coal falling into the lower region designed as a coal bunker 42 and accumulating there. It has proved appropriate to design the coal bunker 42 such that it allows a filling height for the coal of at least one meter, advantageously even more. The nitrogen gas used for supplying the coal via the line 3 collects in the gas space 41. It can be discharged from the latter in a controlled way via the pressure regulating device 5. For this purpose, the filter 51 is preferably designed to be resistant to pressure pulses, in order to compensate pressure surges during the supply of the coal or the adjustment of the regulating valve 52. Further, optionally, nitrogen may additionally be supplied to the gas space 41 via the actuating valve 56. The pressure regulating device 5 is operated via the control device 59 such that, even in the case of fluctuating mass flow of the coal supplied via the supply line 3, the pressure and density in the pressure vessel 4 are kept largely constant, specifically at a value which is sufficient for further transport to the blast furnace 99. What is achieved thereby is that the same pressure difference takes effect over all the lance lines 90 which are in operation. To be precise, the pressure required for further transport does not correspond exactly to the pressure in the gas space 41, but to the pressure, increased by the amount of the static pressure of the coal in the coal bunker 42 and the collecting chamber 72, in the common collecting chamber 72, level with the ports 74.

The height of the coal in the coal bunker 42 is determined by the control device by means of the weight sensors 58'. The control is designed to determine from a weight increase or weight decrease the filling level and consequently differences between the coal mass flows delivered and conveyed away. The aim, in this case, is to keep the filling level as constant as possible. In the event of the switch-off or failure of individual lance lines 90 or in the event of fluctuations of the mass flow supplied via the line 3, changes in the filling height in the pressure vessel 4 may occur. Owing to the separate pressure control, however, the pressure difference with respect to the blast furnace 99 remains unchanged, and therefore the mass flows through the lance lines 90 remain constant. By virtue of the constancy thus achieved with regard to pressure and density, the coal passes uniformly out of the coal bunker 41 into the collecting chamber 72, surrounded by a common wall, of the distributor head 7, a uniform distribution of the coal to the lance lines 90 being achieved by means of the common collecting chamber 72.

For a further increase in the uniformity of coal distribution into the lance lines 90, the individual line control units 8 may be provided. As described above, by means of the quantity sensor 80, they detect the quantity conveyed through the line and, to adapt this quantity, can conduct additional nitrogen via the regulating valve 83. As a result, a highly uniform supply of coal to the various nozzles 91 is achieved.

The invention claimed is:

1. A solids distributor for injection plants, comprising:

a collecting chamber having a plurality of lance lines leading away from the chamber, the chamber having a supply connection for a solid to be distributed, the chamber being surrounded by a common wall in which a plurality of ports is formed, the lance lines being connected to the ports and an annular slot being formed in front of the ports and along the common wall, and a pressure vessel arranged geodetically above the collecting chamber, the lower part of the pressure vessel configured as a bunker, having an outlet providing a direct and continuous junction to the supply connection and an upper part configured as a gas space, wherein the collecting chamber comprises a central displacement body which forms the annular slot with the common wall, the central displacement body comprising a cone which, tapering upward, projects out of the collecting chamber and is configured allow static pressure of the solid in the bunker acting on the supply connection to transport the solid into the lance lines.

2. The solids distributor of claim 1, further comprising a contraction on the pressure vessel above the supply connection.

3. The solids distributor of claim 1, further comprising a regulating device configured to act on the solid located in the bunker.

4. The solids distributor of claim 3, further comprising a filling height control for the solid located in the bunker.

5. The solids distributor of claim 4, wherein the filling height control is configured to maintain a minimum filling height of the solid located in the bunker.

6. The solids distributor of claim 5, wherein the filling height control is further configured to keep a filling height at a constant value.

7. The solids distributor of claim 6, wherein the pressure control device is configured to regulate the pressure of the solid located in the bunker at a level of the connection of the lance lines to the collecting chamber.

8. The solids distributor of claim 1, further comprising a regulatable nitrogen infeed arranged on the gas space.

9. The solids distributor of claim 7, further comprising a pressure sensor configured to determine a pressure in the gas space and to cooperate with the pressure regulating device.

10. The solids distributor of claim 1, wherein the pressure vessel is arranged directly on the collecting chamber.

11. The solids distributor of claim 1, wherein the bunker is of a funnel-shaped design.

12. The solids distributor of claim 1, further comprising specific individual line control units arranged on the lance lines.

13. The solids distributor of claim 1, further comprising gas supplies issuing in the collecting chamber.

14. The solids distributor of claim 13, wherein the gas supplies lead into the collecting chamber from below.

* * * * *